UNITED STATES PATENT OFFICE.

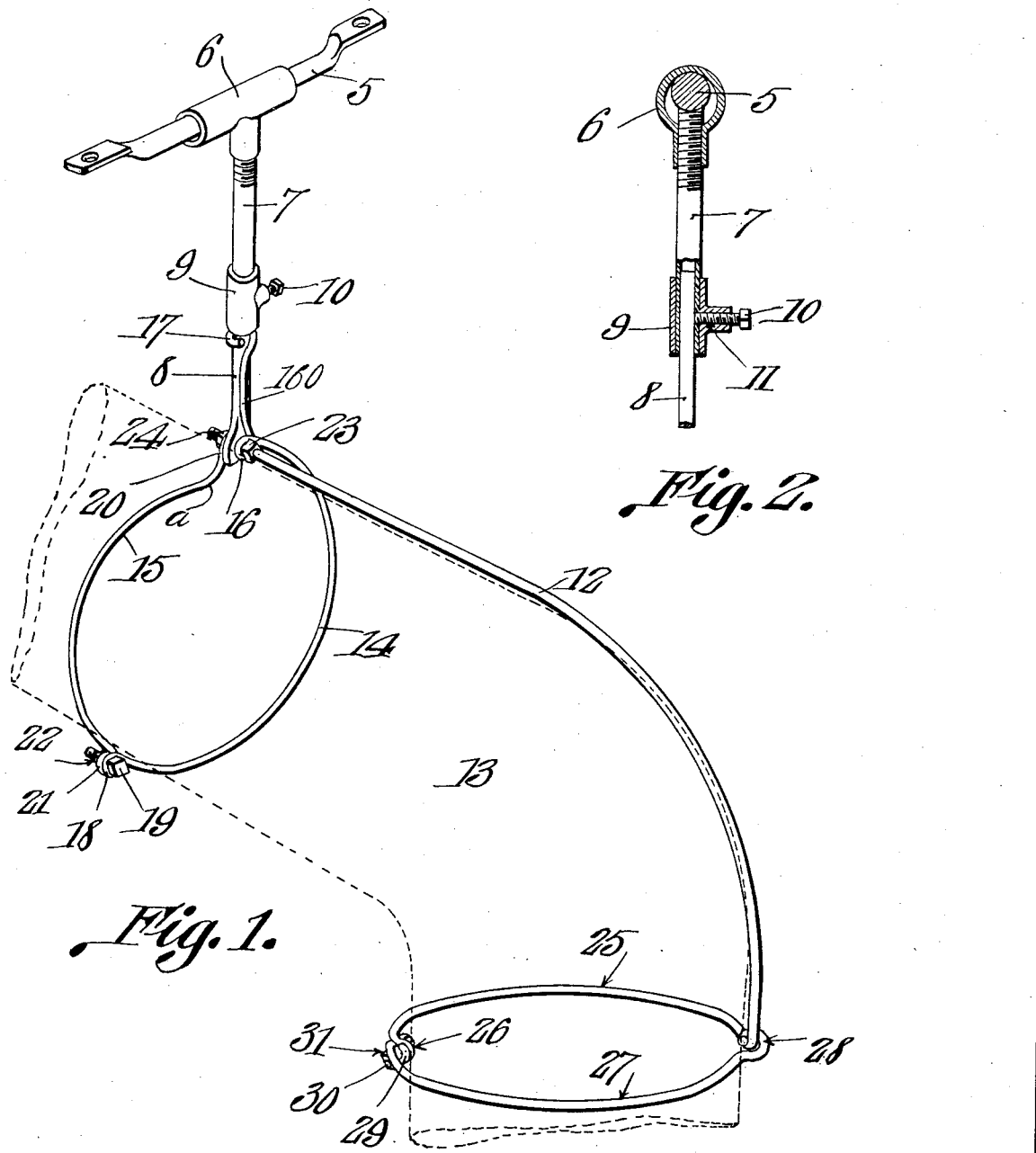

CHARLES D. PEARCE, OF CANTON, MISSOURI.

STOVEPIPE ATTACHMENT.

1,039,587.  Specification of Letters Patent.  Patented Sept. 24, 1912.

Application filed July 11, 1910. Serial No. 571,407.

*To all whom it may concern:*

Be it known that I, CHARLES D. PEARCE, a citizen of the United States, residing at Canton, in the county of Lewis and State of Missouri, have invented a new and useful Stovepipe Attachment, of which the following is a specification.

The present invention relates to improvements in stove pipe attachments, and more particularly as an improvement upon the structure shown in applicant's former Patent No. 953,707, April 5, 1910, the primary object of the present invention being the provision of a flexible rod which can be bent to conform to the curvature of a stove pipe elbow, a pipe encircling ring being carried at one end of the rod and adjacent to the main support thereof and provided with a peculiar shaped inwardly projecting pipe engaging bend adjacent to the junction thereof with the rod and the hanger, said bend tending to grip the pipe to assist in the bending of the flexible rod and at the same time to prevent the downward slipping of the pipe when in supporting position.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing forming a part of this specification, Figure 1 is a perspective view showing the application of the invention, and Fig. 2 is a sectional detail of the suspension means of the device.

Referring specifically to the drawing, 5 denotes a rod which is secured to the ceiling or other part which is to support the pipe. The rod passes through a T-coupling 6, to the intermediate branch of which is connected, by screwing thereinto, a tubular stem 7. The coupling 6 is loose on the rod 5, and is locked thereon by screwing the stem 7 inwardly sufficiently so that it engages the rod. Extending into the lower end of the stem 7 is a shank 8, and on the lower end of the stem is mounted a sleeve 9 carrying a set screw 10, which is adapted to be screwed against that portion of the shank which extends into the bore of the stem, said stem having an opening 11 through which the inner end of the set screw passes.

The parts so far described constitute a support which is adjustably mounted on the ceiling or other part, lateral adjustment being effected by shifting the coupling 6 on the rod 5, vertical adjustment by slipping the shank 8 up or down, in the bore of the stem 7, and angular adjustment by rotating the shank.

The flexible wire or rod 12, has its threaded end passed through an aperture in the lower flattened end of the shank 8, this rod being of such metal that will readily bend, so that the rod can be made to conform to the curvature of the elbow 13. A pipe engaging ring composed of two segmental members 14 and 15, is properly connected to the rod 12, the eye 16 of the member 14 being placed upon the rod 12 upon one side of the flattened end of the shank 8 and between it and the locking nut 23, while the eye 20 of the member 15 is placed upon the extreme end of the rod 12 at the opposite side of the flattened end of the shank 8, the same being clamped thereto by means of the nut 24. Thus the ring is properly secured to and upon the rod 12. The members 14 and 15 are each further provided with the eyes 18 and 21, respectively, through which a bolt 19 is passed, the nut 22 locking these eyes together in pipe surrounding position. The segmental member 15 is provided with an abrupt inwardly extended pipe-engaging bend $a$, which acts as means to more firmly grip the pipe at the junction of the shank 8 and the connection of the ring and rod 12 thereto, and assists in maintaining the ring in such pipe engaging position, both while the clamping eyes 18 and 21 are together and while the rod 12 is being bent to conform to the curvature of the elbow 13. Another clamping ring is carried at the free end of the rod 12. One of the members of this latter clamping ring is formed by making a lateral, and substantially semi-circular bend 25 in the rod 12 at its free end, said bend having a terminal loop 26 to form an eye. The other member is a wire 27 which is bent into substantially semi-circular form, and is loosely connected at one end to the rod 12, by being bent around the same adjacent to the beginning of the lateral bend 25, as indicated at 28. The other end of the wire 27 is bent into an eye 29 which registers with the eye 26. A bolt 30 passes through the eyes 26 and 29, and by means of a nut 31 screwed on said bolt, the two members are held around the pipe, the member 27 swinging toward the member 25 upon tightening up the nut, the rod 12 around which the member 27 is bent serving as a pivotal support.

Thus it will be seen that I have produced improvements over my former patent, other than simply those which result from making its parts of wire. By the present construction I provide a support comprising the members down to and through the shank 8, and a hanger consisting of all the remaining parts and including two pipe clamps. The uppermost of the latter has two bends at either side of the lower end of the shank 8, an arm 160 extending upward alongside the same, and a lateral or deflected bend 17 at its upper end loosely embracing said shank; and therefore when the parts stand in an upright position as seen in Fig. 1, the uppermost pipe clamp is directly below the axis of the support and the rod 12 which holds this clamp to the outer clamp forms the connection between the upper clamp and the support. If it should happen, however, that the stove pipe should be accidentally bent to one side, or even if it should be desired to purposely deflect it a little out of the line of the support, it is quite possible to give the wire a little further or little less bend where it makes the loop 16, so that the arm 160 shall not stand directly in alinement with a diameter through the uppermost clamp and the latter will then in effect stand a little to one side. It is also obvious that by removing the nuts and slipping the eyes at the end of this loop off of the wire 12, then dropping the loop and slipping its bend 17 off the shank 8, the loop can be entirely removed from said shank, and yet the set screw 10 and the adjustment of that part of the support will not be interrupted.

What is claimed as new is:

In a device of the class described, a hanger; a flexible rod extended therethrough and adapted to be bent to conform to the curvature of the elbow; a pipe-engaging ring connected with one end of the rod; segmental members pivoted upon the other end of the rod adjacent to the hanger, one segmental member being provided adjacent the hanger, with an inwardly extended, pipe-engaging bend; and means for connecting the free ends of the segmental members.

In testimony that I claim the foregoing as my own, I have hereto affixed my signature in the presence of two witnesses.

CHARLES D. PEARCE.

Witnesses:
 GUY F. POOL,
 J. E. BECKWITH.

---

Copies of this patent may be obtained for five cents each, by addressing the "Commissioner of Patents, Washington, D. C."